W. H. JOHNSON.
Seeding Machine.

No. 232,826.  Patented Oct. 5, 1880.

Witnesses:

Inventor:
Wm. H. Johnson.
By West & Bond
Attys.

W. H. JOHNSON.
Seeding Machine.
No. 232,826.  Patented Oct. 5, 1880.
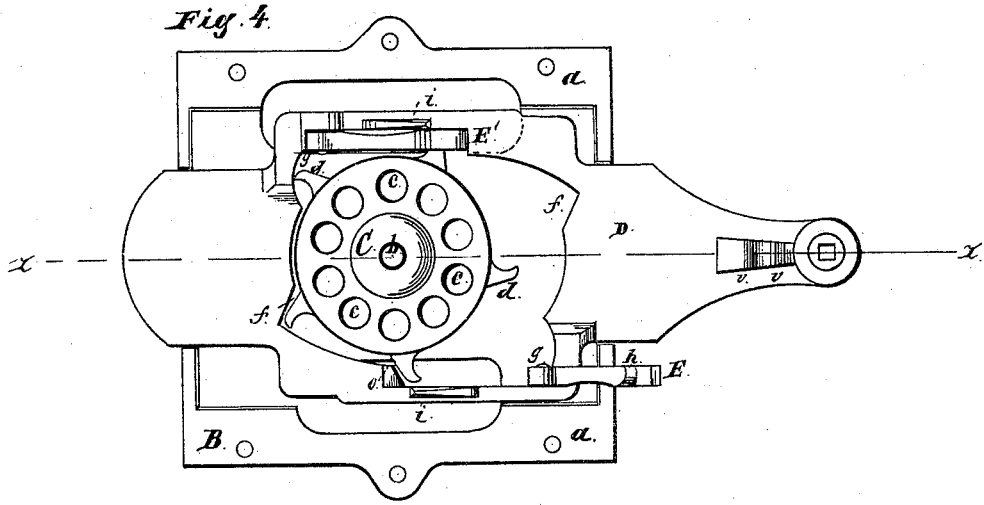
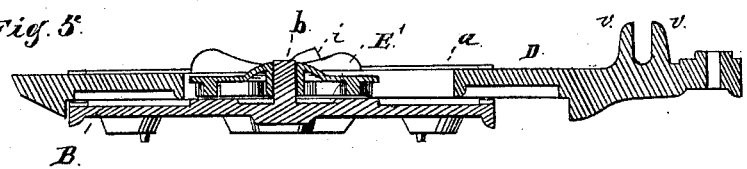
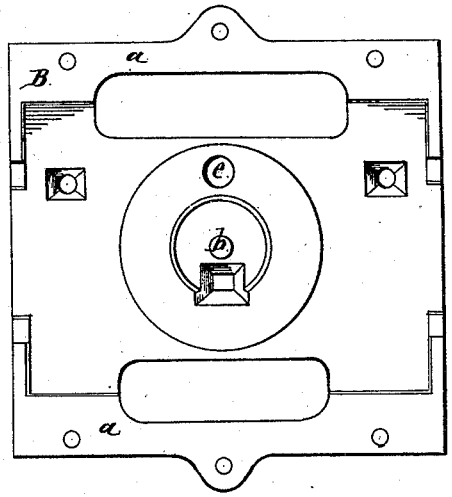
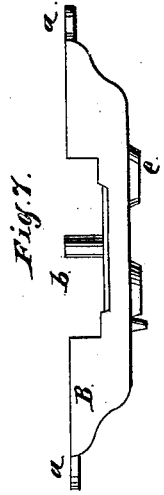
Witnesses:  Inventor:

3 Sheets—Sheet 3.

W. H. JOHNSON.
Seeding Machine.

No. 232,826.  Patented Oct. 5, 1880.

Witnesses:  Inventor:

United States Patent Office.

WILLIAM H. JOHNSON, OF MOLINE, ILLINOIS.

SEEDING-MACHINE.

SPECIFICATION forming part of Letters Patent No. 232,826, dated October 5, 1880.

Application filed July 2, 1879.

*To all whom it may concern:*

Be it known that I, WILLIAM H. JOHNSON, of Moline, Rock Island county, State of Illinois, have invented new and useful Improvements in Seeding-Machines, of which the following is a full description, reference being had to the accompanying drawings, of which there are three sheets, in which—

Figure 1:
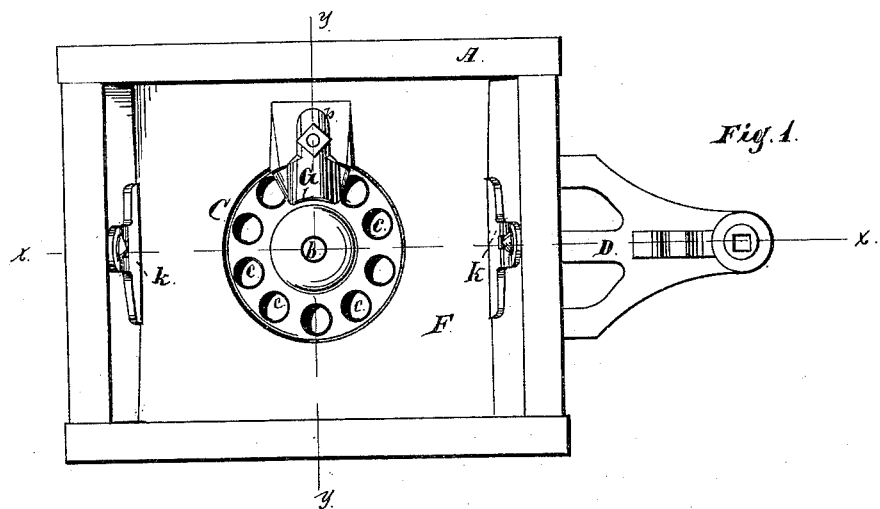
Figure 2:
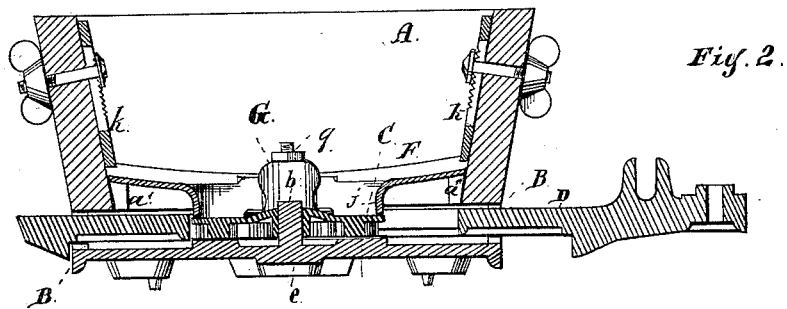
Figure 3:
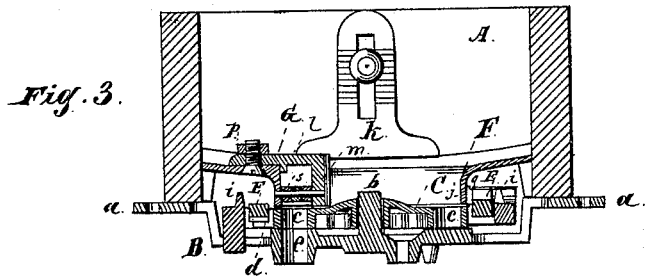
Figure 8:
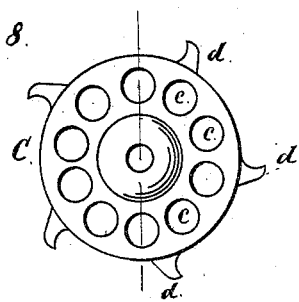
Figure 9:
Figure 10:
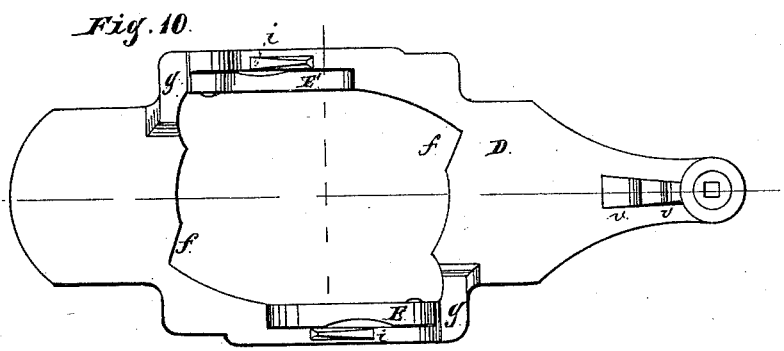
Figure 12:
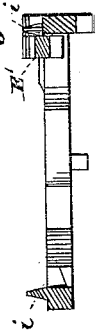
Figure 11:
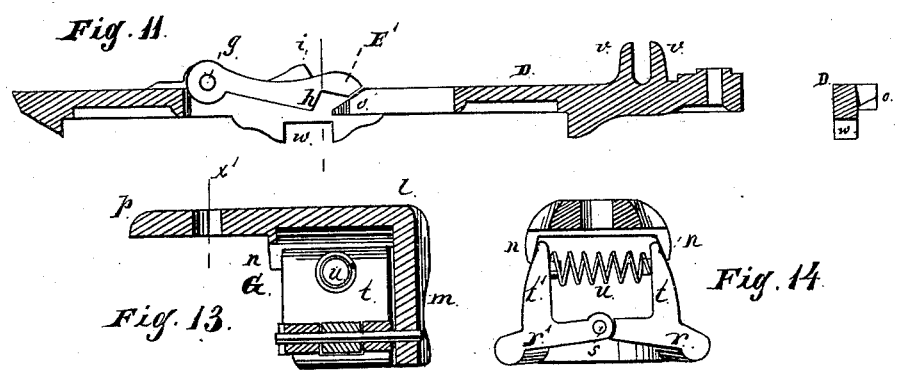
Figure 13:
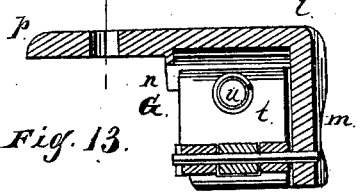
Figure 14:
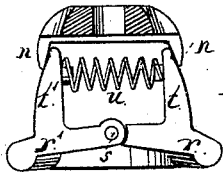
Figure 15:
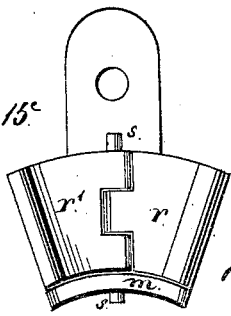

Figure 1 is a plan; Fig. 2, a vertical section at line $x$ of Fig. 1; Fig. 3, a vertical section at line $y$ of Fig. 1. Fig. 4 is a plan of the parts shown, the hopper, cut-off, and plate F having been removed. Fig. 5 is a vertical section taken at line $z$ of Fig. 4. Fig. 6 is a top view of the bottom plate. Fig. 7 is an end view of the same. Fig. 8 is a plan of the dropper; Fig. 9, a central vertical section of the dropper; Fig. 10, a top view of the sliding plate and latches; Fig. 11, a longitudinal section of the same; Fig. 12, a cross-section of the same; Fig. 13, a central longitudinal vertical section of the cut-off; Fig. 14, a rear view of the cut-off, part being in section, at $x'$; Fig. 15, an under-side view of the cut-off.

This invention is primarily designed to be used with corn-planters, but its use is not restricted to such machines. It consists, mainly, in the peculiar construction of the dropper and the means employed to operate the same. The periphery of the dropper is provided with lugs, and it is operated by means of gravitating pawls hinged in the sliding plate, the construction being such that while the dropper will, in use, ordinarily have an intermittent rotary motion, it will have a reverse movement on the return of the slide, in case the operator failed to give the slide its full movement at the last preceding stroke, so that the dropping of the seed is not interfered with in case at any time the slide does not receive a full movement.

In the drawings, A represents a seed-box or hopper which is open at the bottom. B is a metal plate secured to the bottom of the hopper. The main portion of this plate is in a lower plane than the flanges $a$.

C is a dropper, which is circular and is pivoted on a stud, $b$, which extends upward from the plate B. The central portion of the dropper is convex on the top. It is provided with a number of perforations, $c$, which, with the plate B, form seed-cups. As shown, there are ten such seed-cups, but the number may be varied.

$d$ are lugs on the periphery, of which, as shown, there are five. These lugs are curved or concave on that side with which the latches engage, while the backs are formed at only a slight incline from the radial lines, so that the wall or shoulder $o$ of the slide can engage with them without binding when the movement of the seed-wheel or dropper is reversed by reason of there having been less than a full stroke given to the slide. This form facilitates the movement of the latches over the lugs in use, and the inward curve of the acting face holds the shoulder of the latch in place without any tendency to slip over at the end.

The plate B is provided with a single hole, $e$, over which the perforations $c$ are successively brought in use, which hole $e$ is to be located over the seed-tube.

D is a sliding plate resting on the plate B. Its central portion is cut away, leaving a large opening of the form shown in Figs. 4 and 10. In such opening there are two angles, $f f$, into which the lugs $d$ pass in use, which angles serve the purpose of stops.

E E' are two latches, pivoted at $g$ $g$ to the slide D. They are located in the opening in such slide, and in recesses on opposite sides thereof. In Fig. 4 one of these latches is shown thrown up and back, out of use.

The under side of the free end of each latch is inclined, and when the latch is down such incline comes in contact with and rests on a corresponding incline in the wall of the opening in such slide. Near the free end of each latch is a shoulder, $h$, arranged to engage with the lugs $d$ on the dropper C. The under side of each latch is inclined from the shoulder $h$ back toward the hinged end.

$i$ are projections or lugs upon the top of the slide, serving the purpose of guides for the latches. It is preferable to curve the shoulders $h$ as shown on the open latch in Fig. 4.

The latches, the recesses in which they are placed, and the lugs $d$ on the dropper are so arranged that if at any time the slide should not be moved a full stroke, and thereby one of the latches should fail to engage with the proper lug on C, the wall $o$ of the recess will, on the return movement of the slide, engage with one of the lugs *d* and give a reverse movement to the dropper, as hereinafter more fully set forth.

F is a plate fitted in the hopper near the bottom. It has a central opening, from the edge of which a flange, *j*, extends downward nearly to the dropper, leaving the seed-cups exposed. This plate is concave or inclined from the outer edges to the central opening therein, which form renders the passage of all the seed from the hopper to the seed-cups *c* more certain. There are no arms or cross-pieces of any kind over or across the opening in F to obstruct the passage of the seed to the dropper. This plate F can be supported and held in place in any suitable manner. As shown, the walls of the hopper are inclined, the plate fits within the walls, and is held by the side pieces, *k*, and has legs *a'*.

G is a double cut-off. It is composed of three pieces and a spring and a pin, to which two of such pieces are hinged. *l* is one of these pieces. Its front, *m*, extends down nearly to the dropper. A portion of the upper part extends downward a little way, as shown at *n*, on each side. The outer end, *p*, fits a raised place on the plate F, to which it is secured by means of a small bolt, *q*.

*r r'* are two leaves hinged upon a pin, *s*, one end of which passes through *m*, while the other end passes through the flange *j*. *t t'* are side pieces which extend upward from the leaves *r r'*, their upper ends passing inside of the walls *n n*. *u* is a spring between the two parts *t t'*. The outer ends of the leaves *r r'* rest on the dropper C, and are held down by the spring *u*, which permits them to rise as may be necessary. The cut-off is, of course, located over the opening *e*.

Only one hopper and parts connected therewith are shown; but in use in corn-planters such parts will be duplicated as usual, the two slides being connected by means of a bar, and a hand-lever may be used for operating the slides. The lower end of such lever may be located between the lugs *v*.

*w* is a notch in the under side of one edge of the slide, designed to receive one end of a valve in the seed-tube.

The operation is as follows: Suppose the slide and dropper to be in the position shown in Fig. 4, which is the position which they occupy after the slide has been moved as far as possible to the right, both latches being down, as in Fig. 10. Then the latch E will be engaged with and ready to act on one of the lugs *d* of the dropper. Now, if the slide be moved to the left, the shoulder in the latch being in contact with one of such lugs *d*, the dropper will be partially rotated, bringing one of the seed-cups *c* over the hole *e* in B, through which the seed will be discharged. At the same time the latch E', on the opposite side, will be raised by another lug, which will pass under the latch, and when the movement of the slide has been completed this latch E' will fall by gravity, and the shoulder upon this latch will be engaged with such lug, ready to give the dropper another movement when the slide is returned to its former position. With each movement of the slide one of the lugs *d* will pass into one of the angles *f*, and the movement of the dropper will be arrested at the proper point for discharging seed through *e*. Thus with every movement of the slide in either direction the dropper will be made to perform one-tenth of a full revolution, when the holes or seed-cups and the lugs *d* are as shown and described, the dropper always moving in the same direction when the movement of the slide is complete. If the operator should fail to give the slide a full stroke, stopping its movement before the shoulder of the latch which should engage with a lug for the next movement of the dropper had been brought to its proper position, the next movement of the slide would fail to operate the dropper unless special provision were made for obviating this difficulty.

My devices are so constructed that if at any time the operator fails to give the slide its full stroke, leaving one of the latches resting on a lug instead of being engaged with it, such lug will not have been carried beyond the wall *o* of the recess in D at the free end of the latch, and when the slide is moved in the opposite direction such wall *o* will engage with the lug and a reverse movement will be given to the dropper, carrying it back far enough to bring a seed-cup over the opening *e*, thus insuring the dropping of seed with each movement of the slide. This is an important feature, and without it it might frequently happen that the machine would fail to drop seed.

Regarding the curved side of the lug as the front, it will be observed that the wall *o* engages with the back side of the lug when the reverse movement is given to the dropper.

The hole *e* in B is larger than the holes *c*, so that seed will be dropped from *c* when not directly over the center of *e*.

The several parts are so made and arranged that while one of the latches is moving the dropper C the latch on the opposite side and the lug which is to be next acted upon are approaching each other, moving in opposite directions, so that the dropper only has to travel a short distance at each movement of the slide. When a reverse movement is given to the dropper C the shoulders on the latches serve the purpose of stops.

The operation of the cut-off will be understood without describing the same.

I am aware that it is not new to apply lugs to the periphery of a seed-wheel for the purpose of rotating it; but the lugs on my seed-wheel are so made that both faces are operative or made to act in either direction or in a reverse direction in case of an incomplete stroke of the slide. And while it is not new to incline the bottom of a seed-hopper, I believe it to be new to provide a hopper for a horizontal seed-wheel with outer and central inclines, so made as to bring the lowest part of the hopper-bottom into a depressed ring at the circle traversed by the holes in the seed-wheel.

What I claim as new and desire to secure by Letters Patent is as follows:

1. In a seeding-machine, the rotary seed-wheel C, having lugs or projections $d$, curved on their acting faces and nearly radial on their backs, in combination with sliding plate D, having walls $o$ and latches E E', substantially as and for the purpose set forth.

2. In a seeding-machine, the sliding plate D, having a central opening, as described, and the latches E E', hinged on opposite sides of such opening, and in recesses having a wall or shoulder, $o$, adapted to engage with the back of a lug and reverse the movement of the dropper or seed-wheel when a full stroke has not been given in one direction with the reverse movement of such slide D, substantially as and for the purposes specified.

3. In a seeding-machine, the concave plate F, having an open center, and a flange, $j$, in combination with the dropper C, having a raised center, substantially as and for the purposes set forth.

WILLIAM H. JOHNSON.

Witnesses:
J. T. BROWNING,
SAMUEL BENNET.